March 3, 1964 W. PRIESEMUTH 3,123,802
MONITOR FOR LIGHTS IN A FLASHING CIRCUIT
Filed March 9, 1962 2 Sheets-Sheet 1

Inventor
Wolfgang Priesemuth

March 3, 1964   W. PRIESEMUTH   3,123,802
MONITOR FOR LIGHTS IN A FLASHING CIRCUIT
Filed March 9, 1962   2 Sheets-Sheet 2

Inventor
Wolfgang Priesemuth

United States Patent Office 3,123,802
Patented Mar. 3, 1964

3,123,802
MONITOR FOR LIGHTS IN A FLASHING CIRCUIT
Wolfgang Priesemuth, Dorfstr. 22, Itzehoe,
Holstein, Germany
Filed Mar. 9, 1962, Ser. No. 178,715
Claims priority, application Germany Mar. 13, 1961
1 Claim. (Cl. 340—79)

This invention relates to a monitoring device for indicating the operativeness of a number of electric lights that are connected in parallel in a flashing circuit, such as a motor vehicle turn signal circuit; and the invention refers more particularly to a device which not only affords an indication of each flash of the lights in such a circuit, but also indicates how many of the lights in the circuit are lit, to give warning if one or more of the lights are burned out or otherwise inoperative.

It is an object of the present invention to provide a monitoring device adapted to be installed in a flashing light circuit wherein a number of lights to be flashed are connected in parallel with one another and in series with a flasher relay and a current source, and which monitoring device not only provides an indication of each flash of the lights but also indicates the number of lights being flashed so as to give warning when one or more of the lights is burned out or otherwise inoperative, and which, moreover, requires no adjustment or modification to accommodate it to whatever number of lights may be connected in the system.

With the above and other objects in view which will appear as the description proceeds, this invention resides in the novel construction, combination and arrangement of parts substantially as hereinafter described and more particularly defined by the appended claim, it being understood that such changes in the precise embodiments of the herein disclosed invention may be made as come within the scope of the claim.

The accompanying drawings illustrate several complete examples of physical embodiments of the invention constructed according to the best modes so far devised for the practical application of the principles thereof, and in which.

Figure 1:
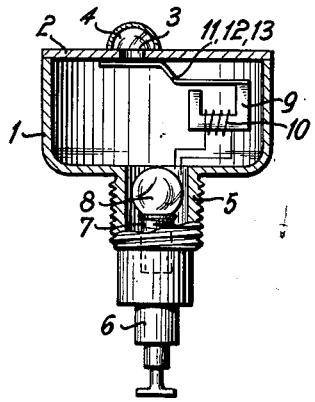
FIGURE 1 is a view partly in side elevation and partly in longitudinal section of a monitoring device embodying the principles of this invention.

Referring now to the accompanying drawings, the numeral 1 designates generally a more or less cylindrical housing having a front wall 2 provided with a number of apertures 3 through which a lamp bulb 8 in the housing can shine, and which are preferably closed by colored hemispherical lenses 4. The housing is intended to be mounted on the instrument panel of a motor vehicle or the like, with its front wall visible to the vehicle operator so that he can readily observe the signals provided by the light shining through the apertures 3. The housing has a reduced diameter rear end portion that may be externally threaded, as at 5, to be received in a suitable mounting hole and secured in place with a nut. A removable insert 6 in the rear end portion of the housing can carry a socket 7 for the lamp bulb 8 and the necessary electrical terminals for the bulb and the mechanism in the housing which is described hereinafter.

Figure 2:
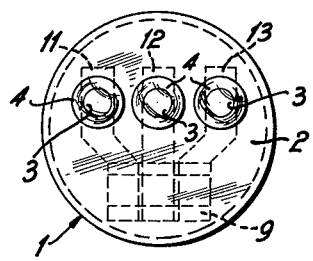
FIGURE 2 is a front view of the device shown in FIGURE 1.

Although three apertures 3 are shown in the front wall of the housing 1, it will be understood that any number of such apertures can be provided, the number of apertures corresponding to the maximum number of lamps expected to be used in a flashing circuit that the device is to monitor. Inside the housing is a current responsive mechanism which, during each cycle of energization and deenergization of the flashing circuit, effects covering and uncovering of that number of the apertures which corresponds to the number of operative lamps in the flashing circuit. Thus if the monitoring device shown in FIGURES 1 and 2 is installed in the cab of a motor vehicle equipped with a flashing turn signal circuit having three lights, and the driver sees intermittent lighting from only two of the apertures 3 when he operates the turn signal mechanism, he knows from this that one of the lights in the circuit is inoperative.

The current responsive mechanism comprises an electromagnet 9 having a winding 10, the terminals of which can be brought to the removable insert 6 in the rear of the housing, in a manner that will be obvious to those skilled in the art, to provide for connection of the winding in a light flashing circuit as hereinafter described.

The current responsive mechanism in the housing also includes armature means cooperating with the electromagnet and providing movable cover means for closing and opening the apertures in the front housing wall 2. In the embodiment of the invention shown in FIGURES 1 and 2 the armature means comprises thin leaf springs 11, 12 and 13 which are so shaped and mounted that their free end portions normally engage the rear face of the front housing wall under flexing bias, with each covering one of the apertures 3. When the magnet is energized, each of the leaf springs can be flexingly attracted to it, out of engagement with the front housing wall, to open the aperture with which it cooperates and permit light to shine therethrough from the lamp bulb 8. Each of the three leaf springs 11, 12 and 13 is biased toward engagement with the front housing wall under a different degree of force. Hence each of the leaf springs will move to its aperture uncovering position in response to a different value of current through the winding 10 of the electromagnet.

Figure 3:
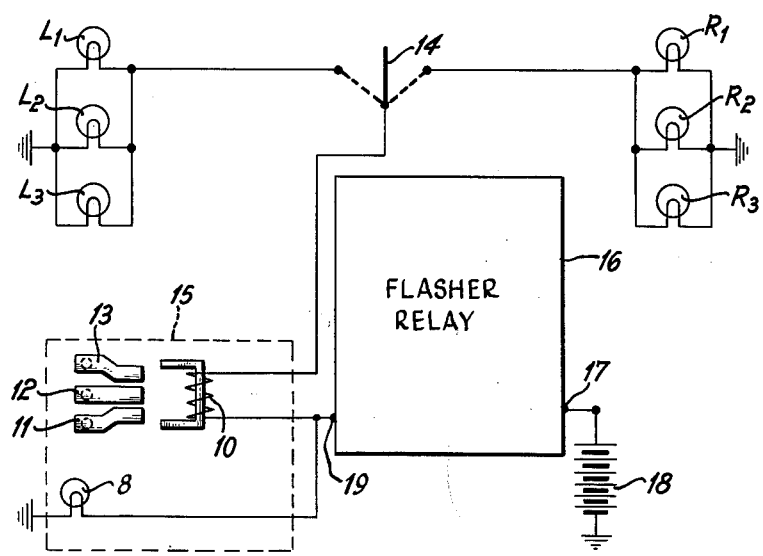
FIGURE 3 is a circuit diagram illustrating how the device of this invention can be incorporated in a motor vehicle turn signal circuit.

FIGURE 3 shows how the monitoring device is connected in a light flashing circuit so that the current through the winding 10 is always proportional to the number of lights that are being lit by the flashing circuit. A double throw switch 14 for controlling the circuit is normally in an intermediate "off" position, but when thrown to either the left or the right it completes one or the other of a pair of flashing circuits, each of which provides for intermittent energization of a group of signal lights. The flashing circuit that is completed when the switch 14 is thrown to its left hand position comprises lights $L_1$, $L_2$ and $L_3$, which are connected in parallel with one another and, connected in series with one another and with said lights, the monitor unit of this invention (designated in FIGURE 3 by a broken line box 15), a flasher relay or interrupter 16, and a battery or other current source 18. Lights $R_1$, $R_2$ and $R_3$ of a right turn signal set are similarly connected in parallel with one another and in series with the monitor, flasher and current source when the switch 14 is thrown to its right hand position.

One terminal 17 of the flasher relay 16 is connected to the ungrounded side of the battery 18, and its other terminal 19 is connected with the electromagnet winding 10, which is in turn series connected with the switch 14 and the group of signal lights that the switch is set to operate. The lamp 8 in the housing can be connected as shown, in parallel with the intermittently energized flashing circuit, between the flasher relay terminal 19 and ground, or it could be shunted across the winding 10 to reduce the number of external connections to the monitoring device.

Because the lights in each flashing circuit are connected in parallel with one another, and the winding 10 is in series with each group of flashed lights, the current through the winding will always be proportional to the number of lamps that are in operation. Hence if one of the lights $L_1$, $L_2$ or $L_3$ is burned out, the current through the winding 10 at each energization of the flashing circuit that includes those lights will be only two-thirds as large it would be if all three lights were operative. The biasing force of the armature or leaf spring 13 is so chosen that said spring will not move to its aperture uncovering position unless the current through the winding 10 corresponds to that drawn by all three lights in a flashing circuit. Similarly the biasing force of the spring 12 is such that it can be moved to its aperture uncovering position when the current through the winding 10 corresponds to that drawn by two lights but not when such current is equal only to that drawn by one light. The spring 11 of course responds to a current value in the winding 10 which is equal to what is drawn by only one light.

It will be obvious that more or less than three apertures could be formed in the housing wall 2, depending upon the number of lamps in the flashing circuit to be monitored. In that event each aperture would of course be provided with its own spring finger corresponding to the fingers 11, 12 and 13, and each spring finger would be set to a different tension, so as to respond to a different value of current through the winding 10, each such value corresponding to a given number of operative lights in the flashing circuit.

Figure 4:
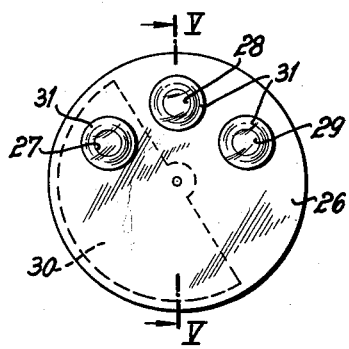
FIGURE 4 is a front view of a modified embodiment of the invention.
Figure 5:
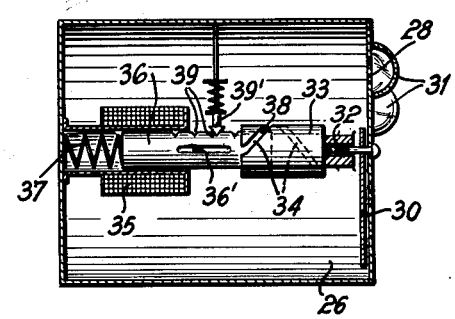
FIGURE 5 is a sectional view taken on the plane of the line V—V in FIGURE 4.

In the embodiment of the invention shown in FIGURES 4 and 5 the cylindrical housing 26 is again shown as having in its front wall three apertures 27, 28 and 29, the centers of which are on an arc concentric with the housing and are circumferentially spaced apart by equal distances. Colored lenses 31 close the apertures, and a lamp could be mounted in the housing if desired.

The cover means by which the apertures are closed comprises a semicircular plate 30 coaxially rotatably mounted directly behind the front housing wall. The current responsive means comprises, in this case, an annular solenoid winding 35 coooperating with a plunger type of armature 36 that is biased forwardly by a coiled compression spring 37. The plunger is held against rotation by means of a cross pin 36' which is secured to the housing and which extends through a longitudinal slot in the plunger. Rotatably carried on the front of the plunger is a collar 33 to which is fixed a coaxial shaft 32 to which the plate 30 is in turn secured. Near its front end the plunger has a guide pin 38 which engages in a helical groove in the collar 33, and since the collar is held against axial motion, back and forth motion of the plunger 36 is translated into rotation of the collar, and hence of the plate 30, by the cooperating pin 38 and slot 34.

When the winding 35 is not energized, the spring 37 maintains the plate 30 in a position of rotation at which it overlies all of the apertures in the front wall of the housing. Energization of the winding effects rotation of the plate in a direction to uncover the apertures, and when the winding is energized by a current corresponding to that drawn by all of the lights in a flashing circuit all of the apertures are uncovered. However, the force of the spring 37 is such that when one or more of the lights in a flashing circuit are not drawing current, the plunger 36 will be attracted only partway into the solenoid 35, carrying the plate to an intermediate position in which it uncovers only so many apertures as correspond to the number of operative lights in the flashing circuit. Obviously the direction of the helical groove in the collar 33 could be reversed so that apertures would be covered by the plate to indicate operativeness of lights and uncovered to indicate inoperativeness.

To prevent undesired swinging of the plate 30, the plunger 36 can be provided with a series of axially spaced detent grooves, each engageable by a lightly biased spring catch 39' in one of the operative positions of the plunger.

Figure 6:
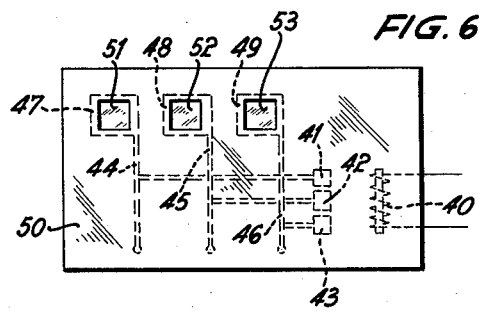
FIGURE 6 is a more or less diagrammatic side view of another modified embodiment of the monitoring device of this invention.

In the embodiment of the invention illustrated in FIGURE 6, the electromagnet, comprising the winding 40, cooperates with a plurality of armatures 41, 42 and 43. In one side wall of the housing 50 there are a plurality of apertures 51, 52 and 53, which normally are respectively closed by shutters 47, 48 and 49 mounted flag fashion on the free upper ends of upright leaf springs 44, 45 and 46, respectively, that are fixed to the housing at their lower ends. Each of the leaf springs is connected with one of the armatures 41, 42 and 43 and biases its armature away from the electromagnet with a force different from that exerted by the other leaf springs.

Upon energization of the electromagnet winding with a sufficiently large current, the armatures are attracted toward the electromagnet, flexing the leaf springs to pull the shutters away from behind their apertures; and of course the number of apertures thus uncovered corresponds to the number of lights that are lit at each flash. The different biasing forces upon the armatures can be achieved by using leaf springs of uniform rigidity connected to their respective armatures at different distances from their fixed lower ends.

Figure 7:
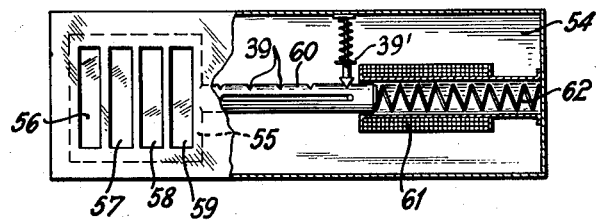
FIGURE 7 is a more or less diagrammatic view, partly in side elevation and partly in longitudinal section, of another modified form of the apparatus.

Another and very simple embodiment of the invention is illustrated in FIGURE 7, wherein the indicating apertures 56, 57, 58 and 59 are again located in the side wall of a housing 54, near one end thereof. As with the embodiment of the invention shown in FIGURES 4 and 5, the current responsive means in the housing comprises an annular solenoid 61, coaxially fixed in the housing near its other end, and an axially movable plunger 60 that is biased away from its attracted position by a coiled compression spring 62. A detent arrangement 39' lightly engages in notches 39 in the plunger to steady the plunger in each of its defined attracted positions.

On its end portion remote from the solenoid the plunger carries a plate or cover 55 which overlies the rear face of the apertured side wall of the housing and covers all of the apertures when the solenoid is not energized. Again, the force of the spring 62 is such that the distance that the plunger 60 is attracted into the solenoid depends upon the current through the solenoid winding, which is of course proportional to the number of lights that are actually lit at each energization of the flashing circuit being monitored. The position of the plunger upon solenoid energization determines the position of the plate 55 attached thereto, so that the number of apertures uncovered corresponds to the number of flashed lights that are operative.

What is claimed as my invention is:

A monitoring device for indicating the operativeness of a plurality of electric lights that are connectable in an energizing circuit in parallel with one another so that they light in unison whenever the energizing circuit is energized, said monitoring device comprising:

A. a wall having a plurality of apertures therein equal to the number of lights;
B. an electromagnet fixed with respect to said wall and having a single winding connectable in said energizing circuit, in series with all of the lights, to be energized by the current through the lights so that the current through said winding is proportional to the number of lights that are in operation;
C. a plurality of magnetic actuator means, one for each aperture, each movable in one direction in response to the attractive force of the electromagnet;

D. means biasing each of the magnetic actuator means in the opposite direction with a different force, so that each of the magnetic actuator means is moved in its first designated direction by a different value of current in the winding; and
E. a plurality of shutters in the housing, each connected with one of the actuator means to be moved thereby toward and from a position covering one of the apertures.

References Cited in the file of this patent
UNITED STATES PATENTS

| | | |
|---|---|---|
| 1,713,051 | Oya | May 14, 1929 |
| 2,064,054 | Beisley et al. | Dec. 15, 1936 |
| 2,091,174 | Zapp et al. | Aug. 24, 1937 |